United States Patent [19]

Miller et al.

[11] 4,406,798
[45] Sep. 27, 1983

[54] SURFACTANT ENHANCED INJECTIVITY OF XANTHAN MOBILITY CONTROL SOLUTIONS FOR TERTIARY OIL RECOVERY

[75] Inventors: James W. Miller, Mystic; Bryce E. Tate, Niantic, both of Conn.

[73] Assignee: Pfizer Inc., New York, N.Y.

[21] Appl. No.: 295,272

[22] Filed: Aug. 24, 1981

[51] Int. Cl.³ .............................................. E21B 43/22
[52] U.S. Cl. .............................. 252/8.55 D; 166/246
[58] Field of Search ............... 252/8.55 R, 8.55 D; 166/246; 435/104

[56] References Cited

U.S. PATENT DOCUMENTS

| | | | |
|---|---|---|---|
| 2,674,619 | 4/1954 | Lundsted | 252/356 X |
| 3,801,502 | 4/1974 | Hitzman | 252/8.55 D |
| 3,811,505 | 5/1974 | Flournoy et al. | 166/274 |
| 3,853,771 | 12/1974 | Felmann et al. | 252/8.55 B |
| 4,008,766 | 2/1977 | Savins | 252/8.55 X |
| 4,077,471 | 3/1978 | Shupe et al. | 166/275 |
| 4,088,189 | 5/1978 | Shupe | 166/272 |
| 4,212,748 | 7/1980 | Ferrell et al. | 252/8.55 D |
| 4,214,999 | 7/1980 | Carlin et al. | 252/8.55 D |
| 4,293,428 | 10/1981 | Gale et al. | 252/8.55 |

*Primary Examiner*—Herbert B. Guynn
*Attorney, Agent, or Firm*—Charles J. Knuth; Peter C. Richardson; Harold W. Ordway

[57] ABSTRACT

An aqueous mobility control solution for tertiary oil recovery from saline oil fields comprises from about 200 to 2000 ppm xanthan biopolymer in the form of clean, unreconstituted fermentation broth and from about 20 to 200 ppm of a selected water-soluble polyglycol-based surfactant. A process for tertiary oil recovery which comprises the injection of the mobility control solution into saline oil-bearing subterranian formations is also disclosed.

6 Claims, 1 Drawing Figure

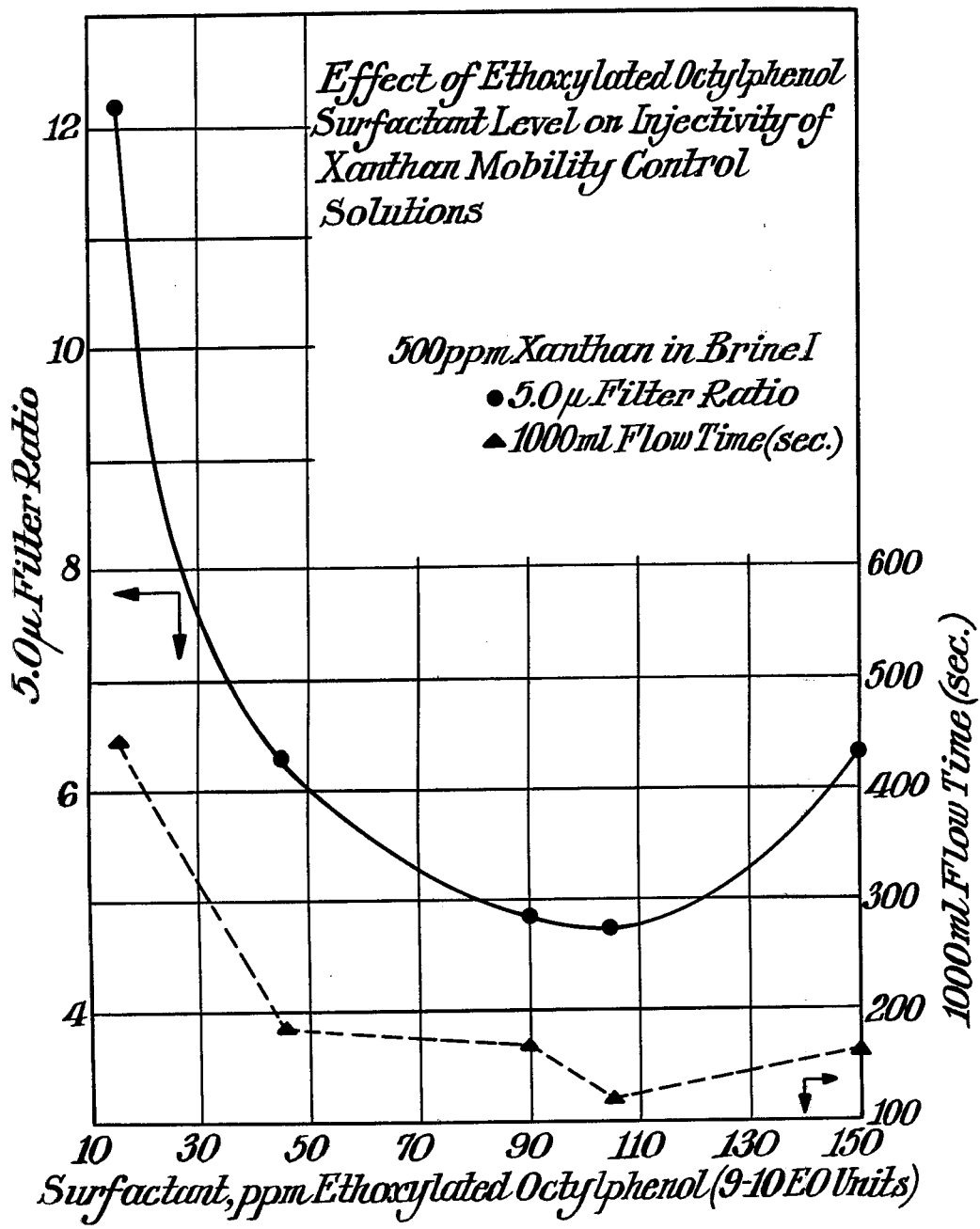

SURFACTANT ENHANCED INJECTIVITY OF XANTHAN MOBILITY CONTROL SOLUTIONS FOR TERTIARY OIL RECOVERY

BACKGROUND OF THE INVENTION

This invention concerns an improvement in the use of polymer flooding for tertiary oil recovery.

Oil is normally recovered from underground reservoirs by a sequence of operations. A newly drilled well generally produces a limited amount of oil by release of internal pressure in the reservoir, being augmented by mechanical pumping means as this pressure becomes depleted. This so-called primary recovery, however, results in only about 15 to 20 percent of the total oil stored in the reservoir. Other techniques must therefore be used for recovery of the remaining oil still trapped within the pores of the formation.

During secondary recovery, commonly known as water flooding, water is pumped into a well adjacent the production well to release the trapped oil and drive it to the production well. Water flooding still leaves about 60 to 70 percent of the available oil in the formation, since the water's comparatively low viscosity allows it to finger through the oil and thus leave large pockets of oil untouched. In addition, surface forces tend to bind the oil to the formation and prevent its displacement. Tertiary oil recovery is therefore commonly used for release of this remaining oil.

One approach to tertiary oil recovery is polymer flooding, which employs a mobility control solution prepared by addition of certain organic polymers to at least a portion of the injected fluid to thicken the water flood. Among these polymers are the xanthan gums, hydrophilic polysaccharides produced by fermentation using bacteria of the genus Xanthomonas. The polymer may be used in the form of the fermentation broth itself, as exemplified in U.S. Pat. No. 4,119,546, or in isolated and reconstituted form, as disclosed in U.S. Pat. No. 3,305,016. Xanthan gums are particularly desirable for polymer flooding since they are good displacing agents; give useful viscosities at low concentrations (5 to 90 centipoise at 100 to 3,000 ppm); are poorly absorbed on the porous rock formations; are relatively insensitive to salts, not precipitating or losing viscosity under normal conditions; and are shear stable, thermostable and viscosity stable over a wide pH range.

An alternative means of tertiary oil recovery is surfactant flooding, in which a surfactant is incorporated into the injection solution to lower the water-oil interfacial tension and thereby emulsify and mobilize the oil so that it may be moved to the production well. In current practice, as disclosed for example in U.S. Pat. Nos. 3,811,505, 4,077,471, 4,088,189 and 4,214,999, the surfactant, either alone or in combination with xanthan polymer, is employed at a level of from about 0.05 to 10 percent by weight of the injection solution.

Attempts at improving the injectivity and mobility characteristics of xanthan mobility control solutions by use of surfactants include U.S. Pat. No. 3,853,771, which approaches the plugging problem sometimes encountered with whole fermentation broths by employing a combination of surfactant, chelant and alkali metal hydroxide to disperse the inner and outer wall layers of the microbial cells; U.S. Pat. No. 3,801,502, which discloses a method of treating diluted xanthan fermentation broth with an alcohol, ketone, phenol or non-ionic surfactant at elevated temperature to adjust the viscosity thereof; and U.S. Pat. No. 4,212,748, which discloses a tertiary oil recovery process in which a reconstituted aqueous xanthan mixture is filtered before injection, a minor amount of surfactant being added to the mixture prior to the filtration to improve its filterability.

While such techniques have contributed to the art of polymer flooding, there still exists a need for a simple and inexpensive means of improving the injectivity and mobility of xanthan mobility control solutions, especially when incorporated in high salinity or hardness brines. It is therefore the primary objective of the present invention to satisfy this need.

SUMMARY OF THE INVENTION

We have now found that the presence of very low levels of selected polyglycol-based surfactants in mobility control solutions prepared from clean, unreconstituted xanthan fermentation broths dramatically improves the injectivity and mobility of the solutions in saline oil field formations.

Accordingly, the present invention entails an aqueous mobility control solution for tertiary oil recovery from saline oil fields which comprises from about 200 to 2000 parts per million xanthan biopolymer in the form of clean, unreconstituted fermentation broth containing cells of an organism belonging to the genus Xanthomonas and from about 20 to 200 parts per million water-soluble surfactant of the formula:

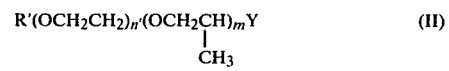

wherein

R is alkyl or alkenyl of from 12 to 18 carbons, octylphenyl or nonylphenyl;

R' is hydrogen or alkyl of from 1 to 6 carbons;

n is an integer of from 5 to 20;

n' is an integer of from 10 to 40 and m is an integer of from 20 to 50 such that n'/m is from about 0.4 to 2; and Y is hydroxyl, $OSO_3M$ or $SO_3M$, wherein M is an alkali metal cation or ammonium.

Preferably, the surfactant of the mobility control solution is of the formula I with R octylphenyl or nonylphenyl, particularly wherein n is an integer of from 7 to 13 and Y is hydroxyl. Also preferably, the control solution contains, or contacts in the oil field, a total salinity of at least about 1000 parts per million, especially wherein the total salinity is from about 30,000 to 250,000 parts per million, the biopolymer is present in the amount of from about 500 to 1500 parts per million, the organism is *Xanthomonas campestris* and the surfactant is ethoxylated octylphenol having 10 ethylene oxide units present in the amount of from about 50 to 150 parts per million.

The invention also entails a process for the recovery of crude oil from a saline oil-bearing subterranean formation which comprises injecting into the formation the above mobility control solution.

BRIEF DESCRIPTION OF THE DRAWING

The above and other objects, features and advantages of the present invention will be appreciated from the following detailed description in conjunction with the accompanying drawing, which illustrates the effect of surfactant level on injectivity enhancement of a xanthan mobility control solution in high salinity brine formations.

DETAILED DESCRIPTION OF THE INVENTION

The enhanced injectivity of xanthan mobility control solutions realized from the practice of the present invention during tertiary oil recovery is observed with oil field brines of varying degrees of salinity, hardness and alkalinity, the enhancement being especially pronounced with oil field brines having a total salinity of about 1000 parts per million or greater. By total salinity in parts per million (ppm) is meant the total soluble salt or ion content present in the solution expressed in milligrams total salt per kilogram brine solution.

The range of brines encompassed by the mobility control solution of the present invention can be seen from Table I. Thus, the solution is particularly suitable for brines of high salinity and high hardness (Brines I and II), especially those having a total salinity of from about 30,000 to 250,000 ppm. Such high salinity oil field brines normally have a pH of from about 6 to 7.5, while seawater will be at about pH 8. The mobility control solution is also effective with brines of low salinity and moderate hardness (Brine III) in which the total salinity will generally be from about 1000 to 10,000 ppm and the hardness (total polyvalent cation content) from about 100 to 1000 ppm, the pH being essentially that of high salinity oil field brine. Enhanced injectivity is further realized with brines of both low salinity (less than 1000 ppm) and low hardness (less than 100 ppm) but of elevated pH, generally of from about 7.5 to 9.

The present mobility control solution comprises xanthan biopolymer in the form of a clean, unreconstituted Xanthomonas fermentation broth. By "clean, unreconstituted fermentation broth" is meant a broth which has not been subjected to heat treatment, filtration or isolation steps following its preparation and produces a mobility control solution which, when evaluated as in Example 1 hereinafter (Brine I, 500 ppm biopolymer, 100 ppm Surfactant A), has an improved injectivity, $R_i$, of 0.5 or less. The broth may be prepared with any of the various species of Xanthomonas bacteria, the preferred species being *Xanthomonas campestris*. A suitable broth preparation is disclosed in U.S. Pat. No. 4,119,546, which is incorporated herein by reference. Effective control solutions are realized with xanthan concentrations of from about 200 to 2000 ppm, with the preferred level being from about 500 to 1500 ppm.

The enhanced injectivity of the mobility control solution of the present invention is realized through the incorporation of low levels of water-soluble surfactant of the formula:

$$R(OCH_2CH_2)_nY \quad \text{or} \quad (I)$$

$$R'(OCH_2CH_2)_{n'}(OCH_2CH)_mY \quad (II)$$
$$\phantom{R'(OCH_2CH_2)_{n'}(OCH_2}|$$
$$\phantom{R'(OCH_2CH_2)_{n'}(OCH_2}CH_3$$

In formula (I), R may be an alkyl or alkenyl of from 12 to 18 carbons, octylphenyl or nonylphenyl; n may be an integer of from 5 to 20; and Y may be hydroxyl, $OSO_3M$ or $SO_3M$ in which M may be an alkali metal cation or ammonium. Preferably, R is octylphenyl or nonylphenyl, especially when n is an integer of from 7 to 13 and Y is hydroxyl.

With surfactants of formula (II), R' may be hydrogen or an alkyl of from 1 to 6 carbons; n' may be an integer of from 10 to 40 and m an integer of from 20 to 50 such that the ratio n'/m is from about 0.4 to 2; and Y may be as in formula (I).

While not wishing to be bound to a given theory, it is believed that the unexpected enhancement in injectivity observed with the low levels of selected surfactant involves the inhibition by the surfactant of aggregation and agglomeration of the xanthan biopolymer and xanthan-coated cells in high salinity brines. While the enhancement is realized at surfactant levels of from about 20 to 200 ppm, the preferred surfactant level, as can be seen from the accompanying drawing, is in the range of from about 50 to 150 ppm, particularly from about 70 to 120 ppm.

Other components not deteriously affecting the enhanced injectivity may also be incorporated into the mobility control solution. Such components might include, for example, biocides to prevent microbial deterioration of the xanthan biopolymer and chelating agents to sequester polyvalent ions such as iron.

The following examples are merely illustrative and are not to be construed as limiting the invention, the scope of which is defined by the appended claims.

GENERAL TEST PROCEDURES

Synthetic Oil Field Brine Preparation

Four synthetic oil field brine solutions representing varying degrees of salinity and hardness were prepared with the compositions indicated in Table I by dissolving reagent grade salts in distilled water and filtering the resulting solutions through 0.2 micron (u) Amicon membranes prior to use to remove any microbial growth or other particulate matter.

Xanthan Mobility Control Solution Preparation

A 5000 parts per million (ppm) xanthan stock solution, prepared by diluting a clean, unreconstituted xanthan broth (Flocon ™ 1035 or Flocon 4800, Pfizer Inc., New York, N.Y.) with synthetic brine solution, was sheared for two minutes at 50 volts in a Waring blender set at its maximum speed. The stock solution was further diluted to 500 ppm with additional synthetic brine solution and sheared for one minute at 50 volts. The desired level of surfactant was then added with gentle stirring to the resulting mobility control solution just prior to its evaluation.

Unless otherwise indicated, xanthan content is given on a viscosity assay basis. This assay is defined such that a 500 ppm xanthan solution prepared in 500 ppm total salinity (9/1 $NaCl/CaCl_2$) has a viscosity of 10 centipoise (cps) when measured by a Brookfield viscometer with UL adapter at 6 RPM and room temperature (20°-25° C.).

TABLE I

| Synthetic Oil Field Brines | |
|---|---|
| Component | Concentration, mg/kg (ppm) of Final Brine |
| Brine I: High salinity, high hardness (pH 7) | |
| NaCl | 60,690 |
| $CaCl_2$ | 5,815 |
| $MgCl_2.6H_2O$ | 8,358 |
| $NaHCO_3$ | 413 |
| $Na_2SO_4$ | 67 |

TABLE I-continued

Synthetic Oil Field Brines

| Component | Concentration, mg/kg (ppm) of Final Brine |
|---|---|
| KCl | 715 |
| Brine II: High salinity, high hardness (pH 7) | |
| NaCl | 64,220 |
| CaCl$_2$ | 5,505 |
| MgCl$_2$.6H$_2$O | 7,234 |
| NaHCO$_3$ | 136 |
| BaCl$_2$.2H$_2$O | 93 |
| Brine III: Low salinity, moderate hardness (pH 7) | |
| NaCl | 200 |
| Na$_2$SO$_4$ | 210 |
| MgCl$_2$.6H$_2$O | 800 |
| CaSO$_4$.2H$_2$O | 2,770 |
| NaHCO$_3$ | 940 |
| Brine IV: Low salinity, low hardness (pH 8) | |
| CaSO$_4$.2H$_2$O | 596 |
| MgSO$_4$.7H$_2$O | 558 |
| CaCl$_2$ | 114 |
| NaHCO$_3$ | 292 |

Filter Ratio Test/Viscosity Assay

Filter ratio was used as a measure of the injectivity of the prepared xanthan mobility control solutions. In this test, 1000 milliliters (ml) of mobility control solution is filtered through either a 5u or a 1.2u Millipore membrane under a constant pressure of 40 pounds per square inch gage (psig).

The filter ratio is defined as:

$$FR = (t_{1000\ ml} - t_{750\ ml})/t_{250\ ml}.$$

where t is the flow time in seconds for the indicated volume (ml) of filtrate collected. The 5u and 1.2u Millipore filters are used to simulate high and moderate porosity oil-bearing reservoirs, respectively. As the mobility control solution exhibits progressively improved injectivity upon treatment with an active surfactant, the filter ratio decreases, approaching 1.

Surfactants which are operable under this invention are those which, when used as indicated, exhibit improved injectivity, $R_i$, defined as:

$R_i = $ (FR with surfactant)/(FR without surfactant), where $R_i \leq 0.5$ represents significant improvement;
$0.5 < R_i < 1.0$ represents limited improvement; and
$R_i \geq 1.0$ represents no improvement.

The viscosity of the mobility control test solution was determined at room temperature (20°–25° C.) by a Brookfield viscometer at 6 RPM using a UL adapter.

EXAMPLE 1

Treatment of High Salinity Xanthan Mobility Control Solution with Ethoxylated Octyl- and Nonylphenols (7–13 EO Units)

The injectivity of 500 ppm xanthan mobility control solution prepared with and without added surfactant was evaluated as described above for various surfactant additions as indicated in Table II using Brine I as diluent and a surfactant level of 100 ppm.

TABLE II

Injectivity of High Salinity 500 ppm Xanthan Mobility Control Solutions Using Ethoxylated Octyl- and Nonylphenols (7–13 EO Units)
Surfactant Structure: R(OCH$_2$CH$_2$)$_n$Y  (I)

| Surfactant Nature[1] | ppm | Brine | Filter Ratio (FR), 5u | 1000 ml Flow Time, Sec |
|---|---|---|---|---|
| None | — | I | 5–10 | 170–570 |
| A | 100 | I | 1.7 | 30 |
| B | 100 | I | 1.7 | 30 |
| C | 100 | I | 1.7 | 28 |
| D | 100 | I | 1.7 | 30 |

[1]Surfactant:
A-Triton X-100 (Rohm & Haas Company, Philadelphia, Pennsylvania) R = octylphenyl, n = 9–10, Y = OH
B-Triton X-114 (Rohm & Haas), R = octylphenyl, n = 7–8, Y = OH
C-Triton X-102 (Rohm & Haas), R = octylphenyl, n = 12–13, Y = OH
D-Triton N-101 (Rohm & Haas), R = nonylphenyl, n = 9–10, Y = OH Table II clearly shows the dramatic and consistent improvement in injectivity, as measured by the filter ratio, of xanthan mobility control solutions in high salinity brines when the solutions are treated with ethoxylated octylphenol and nonylphenol having 7 to 13 ethylene oxide units in the backbone.

When the testing is repeated with ethoxylated alkylphenols of the general structure of Table II wherein R is octyl or nonyl, n is 5 to 6 or 14 to 20 and Y is OH, OSO$_3$Na or SO$_3$Na, similar results are obtained at surfactant levels of from 50 to 150 ppm.

Enhanced injectivity is also observed with these surfactants at surfactant levels of from 20 to 200 ppm and xanthan levels of from 500 to 1500 ppm in mobility control solutions having a total salinity of from 30,000 to 250,000 ppm.

EXAMPLE 2

Effect of Surfactant Level on Injectivity

Xanthan mobility control solutions were prepared at 500 ppm xanthan level using Brine I and surfactant A of Example 1 at surfactant levels of 15, 45, 90, 105 and 150 ppm. The filter ratio of each solution was then determined, with the results indicated in the accompanying drawing.

These results clearly show that surfactant levels of from about 50 to 150 ppm are very effective in enhancing the injectivity of the polymer mobility control solution, the maximum effectiveness being realized at a surfactant level of about 100 ppm.

EXAMPLE 3

Effect of Surfactant on Maintenance of Xanthan Mobility Control Solution Injectivity Four 1100 gram samples of 500 ppm xanthan mobility control solution in 15,000 ppm sodium chloride were prepared by the general procedure hereinbefore described, two with no surfactant and two containing 100 ppm surfactant A. Each solution was stabilized with 50 ppm 5-chloro-2-methyl-4-isothiazolin-3-one biocide to inhibit microbial growth and then transferred to a 1200 ml brown glass bottle. One set of surfactant treated and untreated solution was tested for injectivity (filter ratio, 1.2u filter) immediately while the other set was stored sealed at room temperature for 7 days before testing. Results of the testing are shown in Table III.

These results clearly show the ability of low levels of surfactant to maintain the injectivity of xanthan mobility control solutions.

TABLE III

| Effect of Surfactant on Maintenance of Xanthan Mobility Control Solution Injectivity | | |
|---|---|---|
| Surfactant level, ppm | None | 100 |
| Injectivity Filter ratio (1.2u) | | |
| Initial | 1.4 | 1.2 |
| After 7 days | 2.5 | 1.2 |
| Flow time, sec (1000 ml) | | |
| Initial | 58 | 28 |
| After 7 days | 130 | 28 |

EXAMPLE 4

Treatment of Lower Salinity, Moderate Hardness Xanthan Mobility Control Solution with Ethoxylated Octylphenols The injectivity of a 500 ppm xanthan mobility control solution prepared with and without added surfactant A using Brine III (645 ppm calcium, 96 ppm magnesium, 683 ppm bicarbonate and 1690 ppm sulfate) as diluent and a surfactant level of 100 ppm was evaluated as in Example 1. The filter ratio (1.2u) for the mobility control solution with no surfactant could not be determined since only 410 ml of filtrate was collected in 600 seconds, at which time the test was discontinued. The filter ratio for the mobility control solution containing 100 ppm surfactant A was 2.1 with a 1000 ml flow time of 60 seconds, indicating the dramatic effect of the presence of the surfactant on the injectivity of this xanthan mobility control solution of low salinity and moderate hardness.

EXAMPLE 5

Treatment of Low Salinity, Low Hardness Xanthan Mobility Control Solution of Elevated pH with Ethoxylated Octyphenols The injectivity of a 500 ppm xanthan mobility control solution prepared with and without added surfactant A was evaluated as in Example 4 using Brine IV (180 ppm calcium, 55 ppm magnesium, 550 ppm sulfate, 212 ppm bicarbonate, pH 8) as diluent and a surfactant level of 70 ppm. Again the filter ratio of the mobility control solution without surfactant was undeterminable, only 820 ml of filtrate being collected in 600 seconds. The filter ratio of the mobility control solution with added surfactant was 1.7 with a 1000 ml flow time of 28 seconds, showing the profound enhancement of injectivity obtained with low levels of surfactant in xanthan mobility control solutions of low salinity and hardness at elevated pH.

EXAMPLE 6

Treatment of High Salinity Xanthan Mobility Control Solution with Ethoxylated Alcohols (5-20 EO Units)

The preparation and evaluation of Example 1 was followed in determining the influence of surfactant addition on the injectivity of 500 ppm xanthan mobility control solutions using surfactant E, an ethoxylated alcohol of the general formula of Table II (Brij 96; ICI Americas Inc., Wilmington, Del.; R is oleyl, n is 10, Y is OH) at a level of 100 ppm surfactant. The treated solution had a filter ratio (5u) of 3.1 at a 1000 ml flow time of 69 seconds, while the untreated solution was as indicated in Table II.

When the testing is repeated with ethoxylated alcohols of the general structure of Table II wherein R is lauryl, n is 5 to 8 and Y is OH, or wherein R is stearyl, n is 18 to 20 and Y is OH, similar results at surfactant levels of from about 50 to 150 ppm are obtained.

EXAMPLE 7

Treatment of High Salinity Xanthan Mobility Control Solution With Ethylene Oxide/Propylene Oxide Polyglycols The preparation and evaluation of Example 1 was followed in determining the influence of surfactant addition on the injectivity of 500 ppm xanthan mobility control solution using surfactant F of the general formula

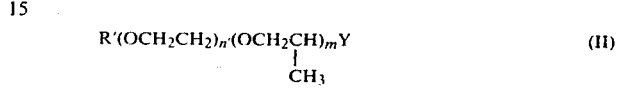

in which R' is H, n' is 20, m is 47 and Y is OH (Pluronic L92; BASF Wyandotte Corp., Parsippany, N.J.) at a surfactant level of 100 ppm. The mobility control solution with the added surfactant had a filter ratio (5u) of 2.6 at a 1000 ml flow time of 59 seconds, while that without surfactant was as indicated in Table II.

When the testing is repeated with ethylene oxide/propylene oxide polyglycols of the general structure (II) wherein R' is methyl to hexyl, n' is 10 to 40, m is 20 and Y is $OSO_3Na$ or $SO_3Na$, enhanced injectivity results at surfactant levels of from 20 to 200 ppm.

EXAMPLE 8

Treatment of High Salinity Mobility Control Solution with Ethoxylated Octylphenols Berea Core Testing The injectivity of a xanthan mobility control solution is also measured using Berea sandstone cores, the solution resistance factor, RF, and residual resistance factor, RRF, defined below, relating to the injectivity of the solution; as injectivity improves, the resistance factor and residual resistance factor drop.

In the Berea core test, conducted at room temperature (20°-25° C.), a 1-inch (25 mm) diameter Berea sandstone core having an air permeability value of about 150 millidarcies is saturated under vacuum with the brine solution used as diluent for the mobility control solution preparation. The brine is injected through the core at a constant advance rate of 20 feet (6.1 meters) per day until the pressure differential $P_1$ across the core stabilizes, the variation in pressure differential with volume injected being recorded throughout the testing.

The xanthan mobility control solution is then injected into the core at an advance rate of 20 feet per day for 40 pore volumes, and the pressure differential $P_2$ at the end of this polymer flood period noted. Brine is then injected into the core at an advance rate of 20 feet per day until the pressure differential $P_3$ stabilizes. The values of RF and RRF are then determined from the equations $RF = P_2/P_1$ and $RRF = P_3/P_1$.

The injectivity of the 500 ppm xanthan mobility control solution of Example 1 (Brine I), with and without 100 ppm added surfactant A, was determined through Berea cores as outlined above, resulting in the followig values:

| Surfactant Added | RF | RRF |
| --- | --- | --- |
| none | 6.93 | 3.54 |
| 100 ppm | 5.27 | 3.04 |

We claim:

1. An aqueous mobility control solution for tertiary oil recovery from saline oil fields, which comprises from about 200 to 2000 parts per million xanthan biopolymer in the form of "clean, unreconstituted fermentation broth" containing cells of an organism belonging to the genus Xanthomonas and from about 20 to 200 parts per million water-soluble surfactant of the formula:

$$R(OCH_2CH_2)_nY \quad \text{or} \quad (I)$$

$$R'(OCH_2CH_2)_{n'}(OCH_2\underset{\underset{CH_3}{|}}{C}H)_mY \quad (II)$$

wherein

R is alkyl or alkenyl of from 12 to 18 carbons, octylphenyl or nonylphenyl;
R' is alkyl of from 1 to 6 carbons;
n is an integer of from 5 to 20;
n' is an integer of from 10 to 40 and
m is an integer of from 20 to 50 such that
n'/m is from about 0.4 to 2; and
Y is hydroxyl, $OSO_3M$ or $SO_3M$, wherein M is an alkali metal cation or ammonium.

2. The mobility control solution of claim 1 wherein said surfactant is of said formula I and R is octylphenyl or nonylphenyl.

3. The mobility control solution of claim 2 wherein n is an integer of from 7 to 13 and Y is hydroxyl.

4. The mobility control solution of claim 1 wherein said solution contains a total salinity of at least about 1000 parts per million.

5. The mobility control solution of claim 4 wherein said total salinity is from about 30,000 to 250,000 parts per million, said biopolymer is present in the amount of from about 500 to 1500 parts per million, said organism is *Xanthomonas campestris* and said surfactant is ethoxylated octylphenol having 10 ethylene oxide units present in the amount of from about 50 to 150 parts per million.

6. A process for the recovery of crude oil from a saline oil-bearing subterranean formation, which comprises injecting into said formation the mobility control solution of claim 1 and displacing the oil from said formation.

* * * * *